US005478224A

United States Patent [19]

McGuffey

[11] Patent Number: 5,478,224

[45] Date of Patent: Dec. 26, 1995

[54] APPARATUS FOR DEPOSITING A MATERIAL ON A SUBSTRATE AND AN APPLICATOR HEAD THEREFOR

[75] Inventor: Grant McGuffey, Peachtree City, Ga.

[73] Assignee: Illinois Tool Works Inc., Glenview, Ill.

[21] Appl. No.: 191,086

[22] Filed: Feb. 4, 1994

[51] Int. Cl.$^{6}$ .............................. B29C 47/00; B05B 7/16

[52] U.S. Cl. ............................ 425/7; 425/72.1; 425/113; 425/461; 264/12; 264/13; 118/302

[58] Field of Search ............................ 425/7, 72.2, 72.1, 425/461, 466, 113, 6; 264/176.1, 210.8, 140, DIG. 47, 12, 14, 13; 118/300, 302

[56] References Cited

U.S. PATENT DOCUMENTS

| | | | |
|---|---|---|---|
| Re. 33,481 | 12/1990 | Ziecker et al. | 425/7 |
| 2,212,448 | 8/1940 | Modigliani | 425/7 |
| 2,297,726 | 10/1942 | Stephanoff | 425/7 |
| 2,628,386 | 2/1953 | Tornberg | 425/190 |
| 3,213,170 | 10/1965 | Erdmenger et al. | 425/7 |
| 3,334,792 | 8/1967 | Vries et al. | 425/190 |
| 3,488,806 | 1/1970 | De Cecco et al. . | |
| 3,650,866 | 3/1972 | Prentice | 156/181 |
| 3,704,198 | 11/1972 | Prentice . | |
| 3,755,527 | 8/1973 | Keller et al. . | |
| 3,825,379 | 7/1974 | Lohkamp et al. | 425/72 |
| 3,849,241 | 11/1974 | Butin et al. . | |
| 3,861,850 | 1/1975 | Wallis | 425/461 |
| 3,874,886 | 4/1975 | Levecque et al. | 425/7 |
| 3,920,362 | 11/1975 | Bradt | 425/7 |
| 3,942,723 | 3/1976 | Langdon | 239/135 |
| 3,947,537 | 3/1976 | Buntin et al. | 264/137 |
| 3,970,417 | 7/1976 | Page . | |
| 3,978,185 | 8/1976 | Buntin et al. | 264/93 |
| 4,015,963 | 4/1977 | Levecque et al. | 425/7 |
| 4,015,964 | 4/1977 | Levecque et al. | 425/7 |
| 4,050,866 | 9/1977 | Kilsdonk | 425/192 |
| 4,052,183 | 10/1977 | Levecque et al. | 425/7 |
| 4,100,324 | 7/1978 | Anderson et al. | 428/288 |
| 4,145,173 | 3/1979 | Pelzer et al. | 425/141 |
| 4,189,455 | 2/1980 | Raganato et al. | 425/7 |
| 4,277,436 | 7/1981 | Shah et al. | 264/176.1 |
| 4,300,876 | 11/1981 | Kane et al. | 425/66 |
| 4,340,563 | 7/1982 | Appel et al. | 264/210.8 |
| 4,359,445 | 11/1982 | Kane et al. | 264/518 |
| 4,380,570 | 4/1983 | Schwarz | 264/12 |
| 4,526,733 | 7/1985 | Lau | 264/12 |
| 4,645,444 | 2/1987 | Lenk et al. | 425/192 S |
| 4,708,619 | 11/1987 | Balk | 425/141 |
| 4,785,996 | 11/1988 | Ziecker et al. | 239/298 |
| 4,818,463 | 4/1989 | Buehning | 264/40.1 |
| 4,818,464 | 4/1989 | Lau | 425/72.2 |
| 4,889,476 | 12/1989 | Buehning | 425/72.2 |
| 4,923,706 | 5/1990 | Binley et al. | 426/516 |
| 4,983,109 | 1/1991 | Miller et al. | 425/7 |
| 5,066,435 | 4/1991 | Lorenz et al. | 425/141 |
| 5,098,636 | 3/1992 | Balk | 425/72.2 |
| 5,145,689 | 9/1992 | Allen et al. | 425/72.2 |
| 5,165,940 | 11/1992 | Windley | 425/72.2 |
| 5,269,670 | 12/1993 | Allen et al. | 425/7 |

FOREIGN PATENT DOCUMENTS

| | | | |
|---|---|---|---|
| 756907 | 9/1956 | United Kingdom | 425/7 |
| 1392667 | 4/1975 | United Kingdom | 425/7 |
| WO93/15895 | 8/1993 | WIPO . | |

*Primary Examiner*—Jay H. Woo
*Assistant Examiner*—Vi Duong Dang
*Attorney, Agent, or Firm*—Schwartz & Weinrieb

[57] ABSTRACT

Apparatus for dispensing a material, such as by meltblowing, wherein the apparatus provides a flow of air in a first direction and a flow of material in a second direction at an angle with respect to the first direction, and wherein the air flow contacts the material flow and propels the material in a direction substantially parallel to the first direction of the air flow for deposition on a desired substrate.

20 Claims, 3 Drawing Sheets

APPARATUS FOR DEPOSITING A MATERIAL ON A SUBSTRATE AND AN APPLICATOR HEAD THEREFOR

BACKGROUND OF THE INVENTION

1. Field of the Invention

This invention relates generally to material dispensing systems, and more particularly to a method and apparatus for depositing a substantially viscous material, such as an adhesive, onto a desired substrate in a predetermined quantity and pattern. Preferably, the adhesive is meltblown onto the substrate by extruding the material from a die and contacting the material with high velocity hot air from one side thereof to break up the adhesive into fine particles and propel the particles in a direction substantially parallel to the direction of the air flow and onto the substrate. Both the material and air flows are preferably provided at the point of impact in a sheet and can be readily adjusted to provide a variety of thicknesses and patterns depending upon the desired application.

2. Description of the Related Art

Meltblowing generally refers to a process which includes contacting viscous material with high velocity hot air as the material exits a nozzle or die. The material is typically is blown onto a collector so as to form a web of material or onto a substrate so as to form a desired coating thereon.

An example of a nozzle or die for meltblowing materials is illustrated in U.S. Pat. No. 5,145,689 which discloses a die having a triangular nosepiece of a predetermined length with a plurality of minute material orifices positioned along the length of the apex of the nosepiece, each orifice extruding a filament of material. Hot air passages are positioned on opposite sides of the apex and along the length of the nosepiece so as to contact the filaments of material as they are dispensed. The air stretches and draws the material by drag forces forming microsized filaments substantially having a continuous cross-section corresponding to the shape of the orifices. In use, a plurality of dies are positioned in tandem and intermittent operation of the dies enables a desired pattern of filaments to be deposited on the substrate.

Such a die, however, does not provide for any adjustability of the material flow. Adjustability is advantageous to vary both the pattern and amount of material emitted.

Additionally, the angle between the air and material flows in the noted patent is selected to prevent break-up of the filaments so that the shape of each filament is maintained as it is deposited on the substrate. Furthermore, to enable complete coverage of the substrate, a large number of closely positioned orifices must be provided which can be difficult to machine and keep from clogging.

It therefore would be desirable to provide a method and apparatus for dispensing a substantially viscous material onto a desired substrate which provides complete, even coverage of the substrate, where the pattern and the amount of material emitted from the apparatus can be readily adjusted to accommodate a variety of applications and which is easy to manufacture and prevent from clogging.

SUMMARY OF THE INVENTION

The invention provides a method and apparatus for depositing a material upon another surface where the method includes providing a flow of air in a first direction and a flow of material in a second direction. The air contacts the material flow and propels the material in a direction substantially parallel to the flow of air.

Both the material and air flows are preferably provided in a sheet or film where the air breaks up the material flow upon impact. The apparatus enables adjustment of the size and shape of the material deposited either by adjustment of the air flow or the material flow and is provided in modular form for ease of service.

BRIEF DESCRIPTION OF THE DRAWINGS

Various other objects, features, and attendant advantages of the present invention will be appreciated from the following detailed description when considered in connection with the accompanying drawings, in which like reference characters designate like or corresponding parts throughout the several views, and wherein.

DESCRIPTION OF THE PREFERRED EMBODIMENTS

Figure 1:
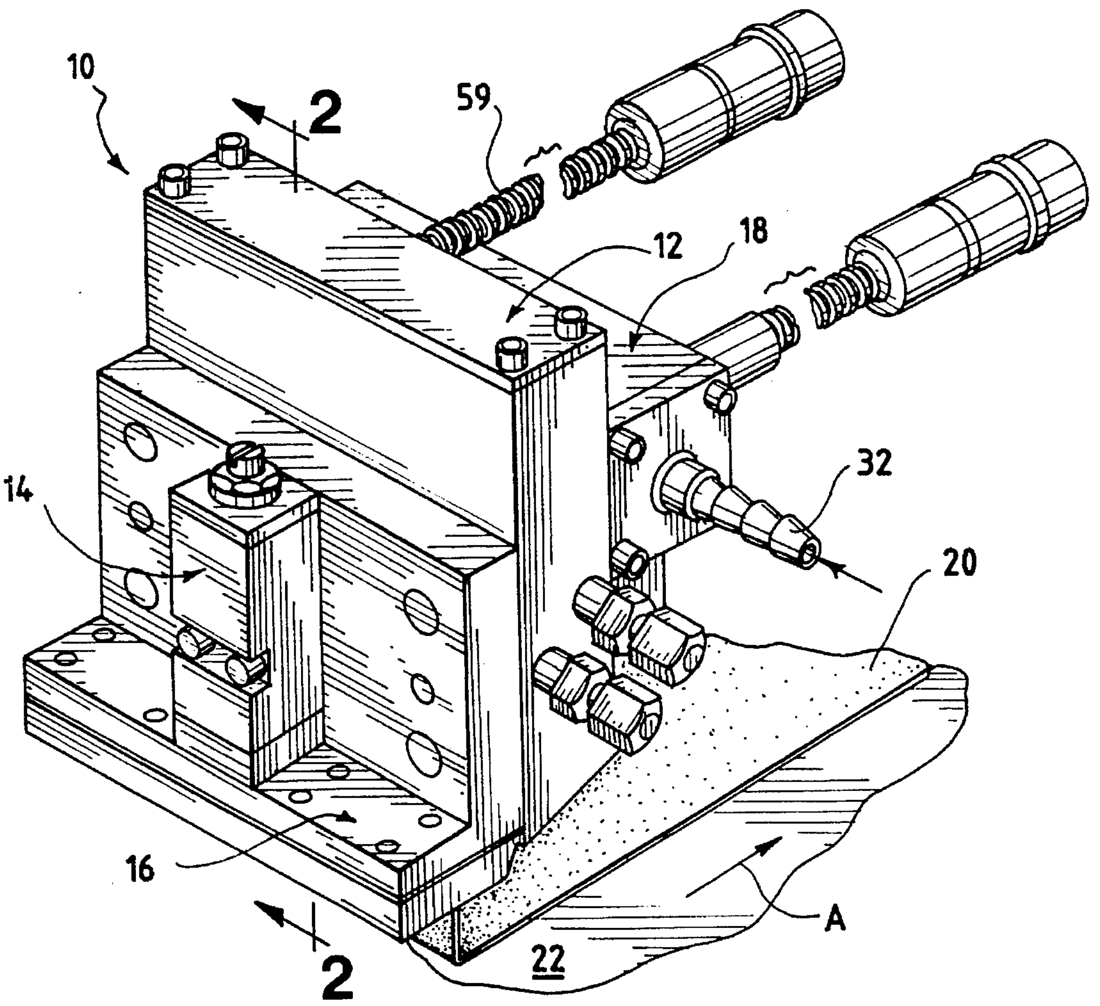
FIG. 1 is a perspective view of the modular applicator head of the invention illustrating a layer of material being deposited upon a substrate.
Figure 2:
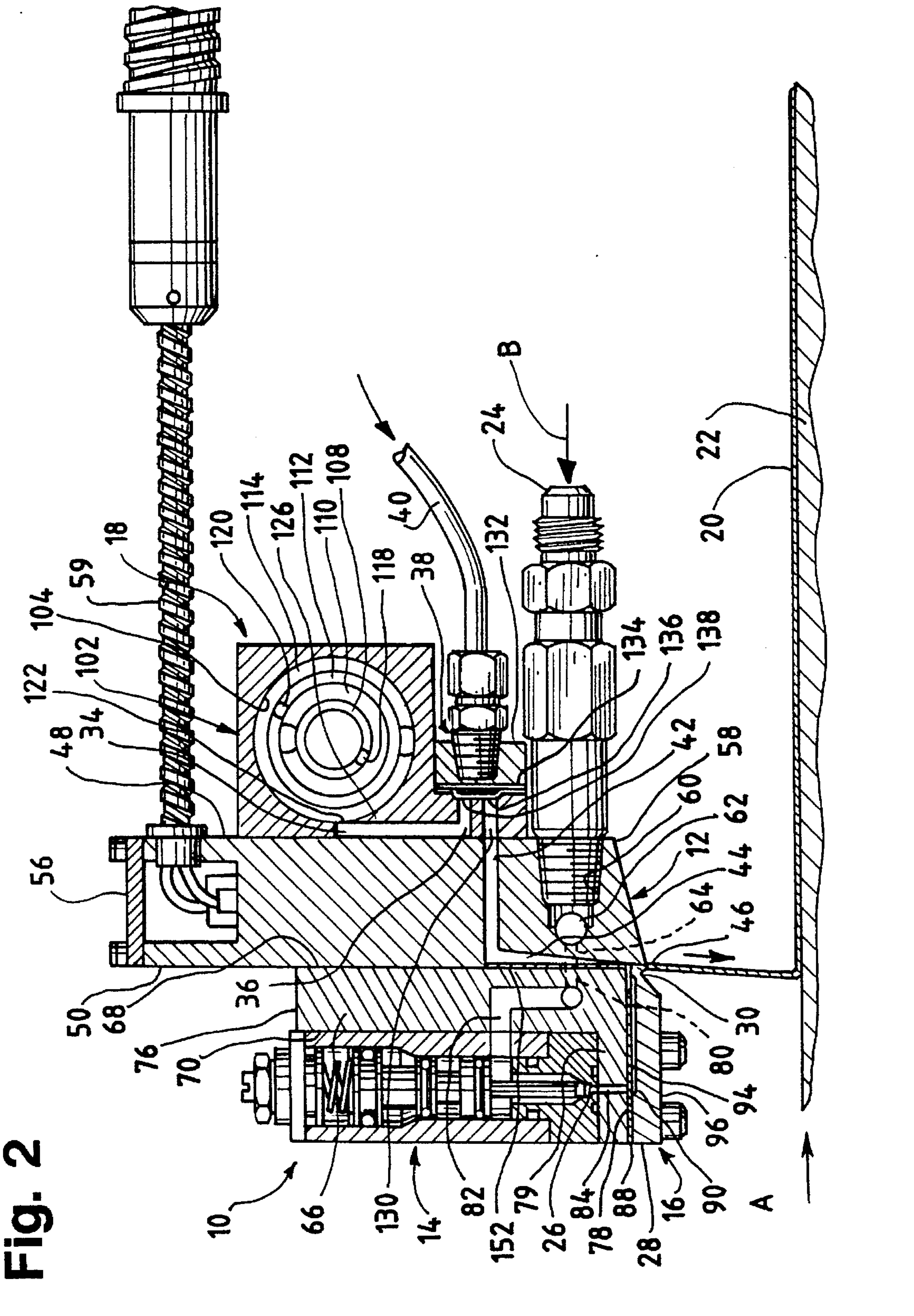
FIG. 2 is a cross-sectional view of the applicator head of FIG. 1 as taken along line 2—2 of FIG. 1.

Referring to FIGS. 1 and 2, the applicator head of the invention is generally designated by the reference numeral 10. The applicator head 10 is preferably mounted upon a support structure (not illustrated) and substantially includes a central manifold assembly 12, a material dispensing valve 14, a material dispensing assembly 16, and an air heating and dispensing assembly 18. Details of these components as well as their interaction and connection to various power and supply lines will be provided herein.

Briefly, in operation, as FIGS. 1 and 2 illustrate, the applicator head 10 is utilized to provide a coating or layer 20 of desired material onto a substrate or collector member 22 which is preferably moving in the direction indicated by arrow "A". Alternatively, the substrate 22 can be stationary and the applicator head 10 can be mounted for movement with respect to the substrate 22.

In either event, the general flow of material and air through the applicator head 10 is as follows. As FIG. 2 illustrates, material is fed to the head 10 through a material supply line 24 to and through the manifold assembly 12 to the dispensing valve 14. Upon actuation of the dispensing valve 14, the material exits an orifice 26 at the bottom of the valve 14 and flows into a nozzle assembly 28 mounted upon the material dispensing assembly 16. The nozzle assembly 28 channels the material back toward the manifold assembly 12 to a nozzle outlet 30.

At the same time, air is supplied from a first air supply line or nipple 32 (illustrated in FIG. 1) to the air heater 18. The air is firstly preheated and then superheated by passing through first and second slots and first and second respective sets or series of heater coils as described in detail below. The superheated air then leaves the air heater 18 along a first air slot 34 and into a first series of air channels 36 which are controlled by an air actuated reed valve assembly 38 having an independent air supply and activation line 40. The air then passes through a second set of air passages 42 within the manifold 12 and into a tapered slot 44 where it is funneled downwardly with respect to FIG. 2 and brought into contact with the material at an impact position proximate the nozzle outlet 30. Upon contact with the material, the air breaks the material up into fine particles and propels the material downwardly with respect to FIG. 2 to a spray outlet 46 for contact with the substrate 22.

Figure 3:
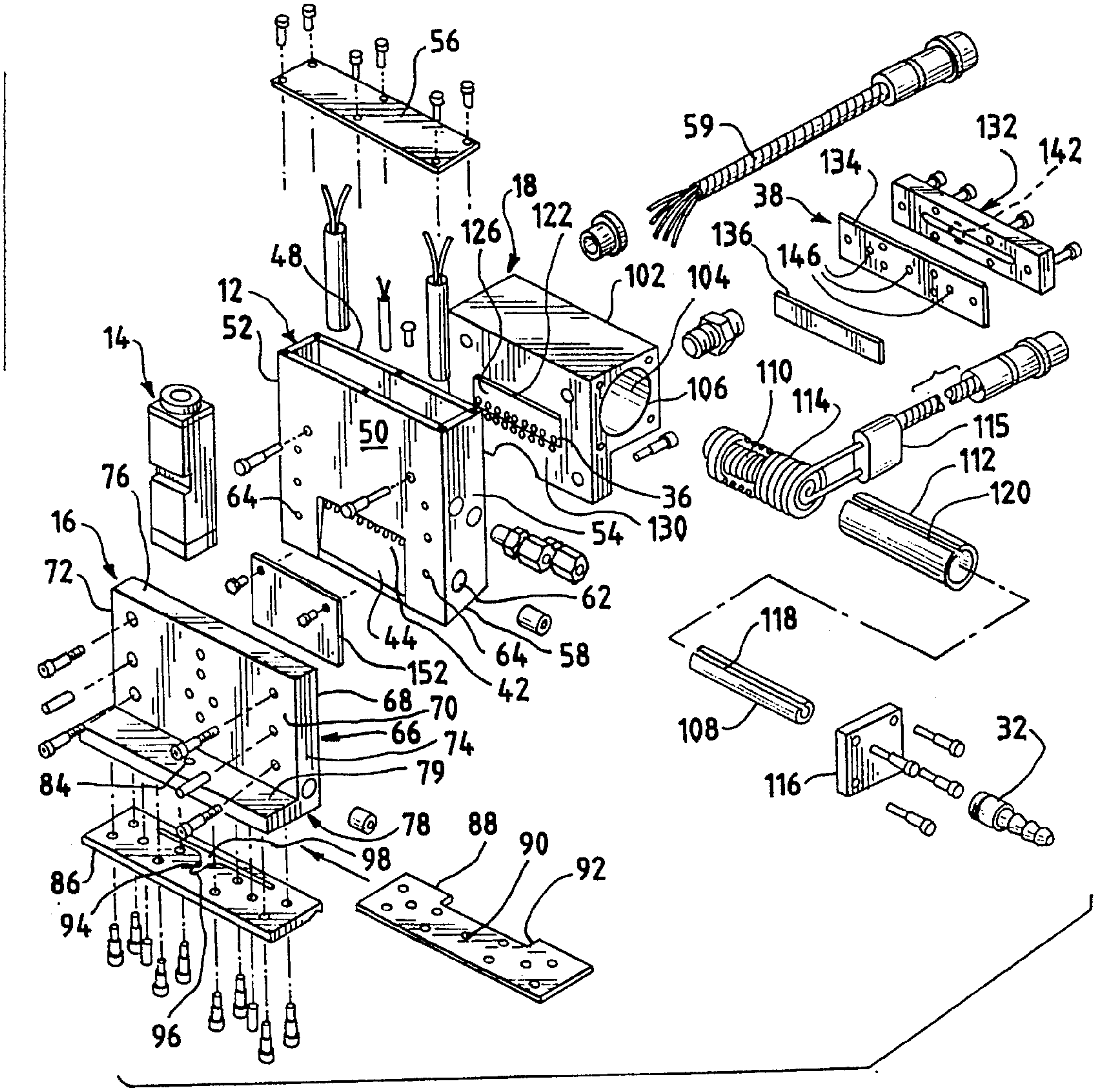
FIG. 3 is a perspective exploded view of the applicator head of FIGS. 1 and 2.

Structural details of the above components will now be provided with reference to FIGS. 2 and 3. For ease of description, structural details will first be provided with regard to the material flow and then with respect to the various air flows of the applicator head 10. Additionally, since the assembly and fastening of the components can be substantially discerned from the drawings, details of such assembly and fastening will be omitted for clarity.

With regard to the material flow, the manifold 12 is formed as a rectangular block, preferably from metal, and functions to direct material from the material supply line 24 to the material dispensing valve 14. The manifold 12 includes first and second opposite sides 48 and 50, first and second opposite ends 52 and 54, a top 56 and a bottom 58. A power supply line 59 extends into the side 48 proximate the top 56 so as to provide power to the dispensing valve 14 and any other desired component.

To accept material from the supply line 24 substantially in the direction of arrow "B" of FIG. 2, the manifold 12 includes a material inlet 60 which includes threads to mount the supply line 24 thereto and is in communication with a first internal passage 62. The passage 62 firstly directs the material in two opposite directions substantially perpendicular to arrow "B" toward the ends 52 and 54. Upon reaching the ends of the passage 62, the material is then directed back in the direction of arrow "B" to channels 64. The material exits the manifold 12 from the channels 64 on the second side 50 of the manifold 12 and it is seen that the channels 64 are positioned proximate the first and second manifold ends 52 and 54.

Upon exiting the channels 64 of the manifold 12, the material enters an adhesive or glue block 66 of the material dispensing assembly 16. The glue block 66 is also preferably made of metal, is substantially L-shaped in cross-section and includes first and second opposite surfaces 68 and 70, first and second opposite ends 72 and 74, a top 76, a bottom 78 and a flange 79.

To accept material from the channels 64 of the manifold 12, the glue block 66 includes two apertures 80 in communication with the channels 64 and an internal passage 82. The passage 82 first directs material toward the center of the glue block 66 and then upwardly therein, and finally to the left with respect to FIG. 2 for communication with the material dispensing valve 14.

The dispensing valve 14 includes the exit orifice 26 and is preferably an air operated type of dispensing valve manufactured by the assignee under the name "MOD-PLUS" and can include the dispensing mechanism illustrated in U.S. Pat. No. 5,121,930 which is assigned to the assignee of this patent application and is hereby incorporated by reference. It is to be understood, however, that the particular type of dispensing valve 14 may vary to include a variety of valves other than the MOD-PLUS dispensing head and without the specific structure of the above referenced patent so long as the desired material flow is provided therethrough.

Upon exiting the orifice 26 the material enters a channel 84 in the flange 79 of the glue block 66. Secured to the bottom 78 of the glue block 66 is a mouthpiece or closure plate 86 with a shim 88 secured therebetween.

The shim 88 provides spacing between the bottom 78 of the glue block 66 and the mouthpiece 86 and includes an initial material flow aperture 90 and a final material flow slot 92 as illustrated in FIG. 3. The material flow proceeds through the aperture 90 and is received in a channel 94 formed in the mouthpiece 86 whose top surface is defined by the shim 88.

The channel 94 is substantially "T" shaped including a material receiving stem 96 and a material exit portion 98 which spreads the material across a desired surface area. Thus, material is conducted into the receiving stem 96, is contained therein by the shim 88, and is advanced along the stem 96 (which is to the right with respect to FIG. 2) into the exit portion 98 which spreads the material across a rectangular area or slot. The material then flows upwardly with respect to FIG. 2 through the slot 92 of the shim 88, contacts the bottom 78 of the glue block 66 and is forced to the right with respect to FIG. 2 to an impact position where it will be contacted by the desired flow of air, broken up into fine particles, propelled downwardly and deposited upon the substrate 22.

Figure 4:
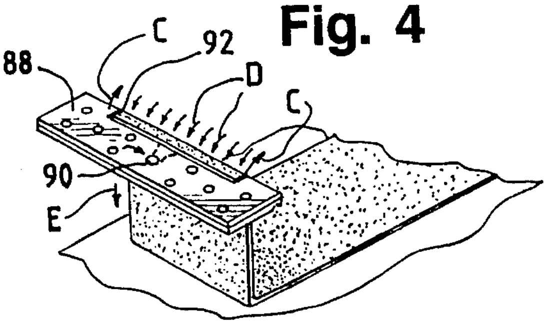
FIG. 4 is a perspective view of a portion of the applicator head of FIG. 3 illustrating the sheets of material and air at an impact position.

FIG. 4 generally illustrates the flow of material out of the slot 92 by arrows "C", the flow of air by arrows "D", and the downward flow of material by arrow "E" which is substantially is parallel to, if not in the same directions as, arrows "D". At the point of impact of the air and material, the angle formed between arrows "C" and "D" is selected so as to enable breaking up of the material into substantially fine particles and propelling those particles in the direction of arrow "D". Preferably the angle between arrows "C" and "D" is ninety degrees, but can vary from approximately forty-five to ninety degrees so long as the head 10 functions as desired.

Figure 5:
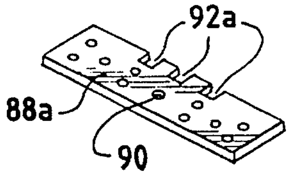
FIG. 5 is a perspective view of an alternate shim that can be utilized with the applicator head of the invention.

To provide different thicknesses or patterns of material flow, the shim 88 can be replaced with another shim having a different thickness and/or slot 92. For example, a thicker shim 88 provides a thicker material flow out of the mouthpiece 86 which increases the amount of material contacted by the air flow. Alternatively, a shim **88*a*, as illustrated in FIG. 5, can be provided with a plurality of slots 92*a*** which in turn provide a plurality of material flows of the same or different widths, depending on the desired application.

Regardless, it is to be noted that adjustability of the material flow can be readily obtained by removal of the mouthpiece 86 and substituting different shims 88 rather than having to design each applicator head 10 for a particular application. This significantly reduces the number of different applicator heads 10 which must be manufactured, stocked, shipped and sold providing a distinct advantage in the marketplace.

Additionally, the material is provided by the mouthpiece 86 and shim 88 in a sheet or film across a desired elongate area or slot at the point of impact without the need of minute orifices. This design not only reduces time and costs of manufacturing the head 10, but also reduces or eliminates possible clogging of the material at the outlet 30.

Turning now to the details of the air flow through the applicator head 10, two separate air supplies are preferably are provided to the applicator head 10. A first air supply is provided by the supply line or nipple 32 that provides air to be heated for actual contact with the material as it exits the glue block 66. The second air supply is provided by the supply and activation line 40 which intermittently supplies air to the reed valve 38 to control the first flow of heated air in contact with the material flow.

As FIG. 3 illustrates, the path of the first air flow begins with the air supply line 32 which supplies air to the heating and dispensing assembly 18. The assembly 18 includes an air body 102 having a large central bore 104 which is open at a first end 106 and closed at a second opposite end (not illustrated.)

As FIGS. 2 and 3 illustrate, the bore 104 preferably includes a minor baffle 108 positioned within a first series of heating coils 110 which in turn is positioned within a major baffle 112. The minor baffle 108, first series of coils 110 and major baffle 112 are then positioned within a second series of heating coils 114.

As FIG. 3 illustrates, the first and second series of heating coils 110 and 114 are formed as a single heating coil having a single electrical connection 115. The first and second coils 110 and 114 are preferably formed from a single length of cable heater material which is initially wound on a first arbor (not illustrated) having a diameter of approximately 0.460". The first series of coils 110 are provided by winding a desired number of coils, preferably fifteen, on the first arbor in a first direction. Thereafter, a second hollow arbor is placed over the first series of coils 110 and the heater cable is wound in a direction opposite the first direction a desired number of coils, which again preferably is fifteen, so as to form the second series of coils 114.

The air supply line 32 is mounted to a flange 116 which closes off the bore 104 with the above described components disposed therein and supplies air to the interior of the minor baffle 108. The minor baffle 108 includes a slot 118 along its length so as to enable air to circulate about the first heating coil 110 within the confines of the major baffle 112. The air then proceeds through a slot 120 in the major baffle 112 so as to circulate about the second heater coil 114 within the confines of the bore 104. The flange 116 provides for the electrical connection 115 of the coils 110 and 114 to extend to the exterior of the air body 102 without escape of air from the bore 104.

It is to be noted that both the minor and major baffles 108 and 112 provide a plenum effect which enables the air to be balanced across the slots 118 and 120. This balancing effect also forces air around and between the heating coils 110 and 114 and provides the desired heating of the air. Additionally, the air is heated in stages. The first stage in which the air is preheated is provided by the first series of coils 110. The second stage in which the air is superheated is provided by the second series of coils 114.

As FIG. 3 illustrates, heated air leaves the bore 104 through a slot 122 which extends through a side wall of the bore 104. A relieved rectangular portion 126 of the air body 102 provides the channel 34 which funnels air downwardly with respect to FIG. 2.

As FIGS. 2 and 3 illustrate, the bottom of the rectangular portion 126 includes the first set of through channels 36 which direct heated air back toward the reed valve assembly 38 for regulating the flow of heated air. A second set of passages or channels 130 is positioned just outside the bottom of the rectangular portion 126 which enable heated air to flow from the reed valve assembly 38 back through the air body 102 toward the manifold 12. The number, size and shape of the channels 36 and 130 can vary so long as they function as desired.

The reed valve assembly 38 is secured to the air body 102, receives the second supply of air from line 40 and includes a reed valve cap 132, a reed diaphragm 134 and a reed 136. As FIG. 2 illustrates, a portion of the air body 102 facing the reed valve assembly 38 is relieved at 138 so as to provide a channel between the diaphragm 134 and the air body 102 in order to accommodate the reed 136.

In operation, the valve cap 132 receives air from line 40 in precise durations from a control assembly (not illustrated) so as to close off the channels 36 and prevent heated air from flowing to the manifold 12. As FIG. 3 illustrates, air enters an aperture 142 of the valve cap 132 and is dispersed laterally along a slot 144. The slot 144 feeds air to a plurality of apertures 146 formed through the diaphragm 134 and enters the relieved portion 138 where it contacts the reed 136. Thus, upon activation, air from the second supply line 40 forces the reed 136 against the air body 102 within the relieved portion 138 so as to close off both sets of channels 36 and 130 and shut off the supply of hot air to the manifold 12.

Conversely, when air from the second supply line 40 is shut off, the heated air from the first set of channels 36 forces the reed 136 against the diaphragm 134 which opens both sets of channels 36 and 130. In this open position of the reed 136, heated air can flow from the first set of channels 36 to the second set of channels 130.

Upon exiting the second set of channels 130, the heated air flows directly into the set of channels or apertures 42 formed through the manifold 12. The opposite ends of the channels 42 terminate at the tapered slot 44 of the manifold 12 which is defined on a side opposite the manifold 12 with the surface 68 of the material dispensing assembly 16.

A second reed valve 152 is mounted below air passage 42 and enables heated air to pass over the top of the reed valve 152 and down the left side of the reed valve 152 as described in detail below. The reed valve 152 assists in retention of residual adhesive during the off cycle and allows a build up of pressure prior to the opening of the reed valve 152 by the heated air flow.

Accordingly, upon leaving the channels 42, air fans out across the width of the tapered slot 44 and is directed downwardly with respect to FIG. 2. A resistive blockage is defined by the reed valve 152 and surface 68 of the material dispensing assembly 16. When sufficient pressure is achieved within the tapered slot 44 by the heated air, the reed valve 152 allows an opening to form between the reed valve 152 and the surface 68 for contact with the material flow as it exits the glue block 66 as described above. It is to be noted that both the air flow and the material flow at the point of impact or contact are substantially in the form of sheets as illustrated in FIG. 4 and are positioned at an angle with respect to each other. Thus, the air flow breaks up the material flow upon contact therewith so as to provide a random but even disbursement of substantially fine material particles across a desired area. By proper synchronization of the air and material flows, the material is deposited as desired on the substrate 22.

As described briefly above, one way to change the thickness or pattern of the material is to replace the shim 88 with a different shim. Additionally, it has been found that both the temperature and volume of the air flow affect the type of pattern deposited on the substrate 22. For example, an increase in temperature, volume or both of the heated air causes a finer pattern to be deposited. Furthermore, when determining the correct settings of temperature and volume, it is possible to counter the effect of one parameter with the other. This feature is most desirable since it enables one to achieve fine patterns on delicate substrates by reducing the volume of air while increasing its temperature.

Modifications and variations of the present invention are possible in light of the above teachings. It therefore is to be understood that within the scope of the appended claims the invention may be practiced other than specifically described.

What is claimed and desired to be secured by Letters Patent is:

1. An applicator head for depositing a material upon a surface, comprising:

a deposition material die body comprising a spray outlet for discharging deposition material out from said deposition material die body and toward said surface onto which said deposition material is to be deposited; an air manifold assembly for conducting a flow of air toward said spray outlet; and a material dispensing assembly, having a surface thereof disposed opposite a surface of said air manifold assembly and along a substantially planar interface defined therebetween, for conducting a flow of material toward said spray outlet;

first flow path means defined within said material dispensing assembly of said deposition material die body for conducting a flow of said material in sheet form along a first direction within said deposition material die body and toward an impact position which is located along said substantially planar interface and adjacent to said spray outlet;

second flow path means, defined within said material dispensing assembly and fluidically connected to said first flow path means, for conducting said material from said air manifold assembly to said first flow path means;

third flow path means defined within said air manifold assembly and fluidically connected to said second flow path means of said material dispensing assembly for conducting a supply of said material from a source of said material, through said air manifold assembly, toward said material dispensing assembly, across said substantially planar interface along which said material dispensing assembly and said air manifold assembly are oppositely disposed, and into said second flow path means of said material dispensing assembly; and fourth flow path means defined within said air manifold assembly for conducting a flow of air in sheet form and along a second direction, within said deposition material die body, which is disposed at a predetermined angle with respect to said first direction of said flow of material so as to contact said material flow with said air flow at said impact position located adjacent to said spray outlet, break up said sheet of material into fine particles, and propel said fine particles of said material, in a direction which is substantially parallel to said second direction of said air flow and along with said air flow, toward and onto said surface as said deposition material.

2. The applicator head as defined in claim 1, further comprising:

means for heating said air flow to a predetermined temperature prior to contact of said air flow with said material flow.

3. The applicator head as set forth in claim 2, wherein:

said means for heating said air flow comprises a combination heating coil and baffle structure.

4. The applicator head as set forth in claim 2, further comprising:

an air body mounted adjacent to said air manifold assembly and including said means for heating said air flow; and air-controlled valve means fluidically interposed between said air body and said air manifold assembly for controlling the flow of said heated air from said air body to said air manifold assembly.

5. The applicator head as set forth in claim 4, wherein:

said air body is mounted upon a side surface of said air manifold assembly which is opposite said surface of said air manifold assembly which forms said substantially planar interface with said material dispensing assembly.

6. The applicator head as defined in claim 1, wherein:

said means for providing said flow of material is adjustable so as to vary at least one of the amount and pattern of said material.

7. The applicator head as set forth in claim 6, wherein said adjustable means for providing said flow of material comprises:

a closure plate secured to said material dispensing assembly and having a material distribution channel defined therein; and a shim interposed between said closure plate and said material dispensing assembly, and having a material flow slot, having a predetermined thickness and material flow control pattern, defined therein, whereby depending upon a particular shim mounted upon said material dispensing assembly, different amounts and flow patterns of said material are able to be discharged toward said spray outlet.

8. The applicator head as set forth in claim 1, wherein:

said spray outlet is located along said interface defined between said material dispensing assembly and said air manifold assembly.

9. The applicator head as set forth in claim 1, wherein:

said spray outlet is disposed substantially perpendicular to said surface onto which said deposition material is to be deposited.

10. The applicator head as set forth in claim 1, wherein:

said predetermined angle defined between said first and second directions of said material and air flows is within the range of 45°–90°.

11. An applicator head for depositing a substantially viscous material onto a substrate, comprising:

a deposition material die body comprising a spray outlet for discharging deposition material out from said deposition material die body and toward said substrate onto which said deposition material is to be deposited; an air manifold assembly for conducting a flow of air toward said spray outlet; and a material dispensing assembly, having a surface thereof disposed opposite a surface of said air manifold assembly and along a substantially planar interface defined therebetween, for conducting a flow of said substantially viscous material toward said spray outlet;

said material dispensing assembly comprising first flow path means for conducting a flow of said substantially viscous material in sheet form along a first direction within said deposition material die body and toward an impact position which is located along said substantially planar interface and adjacent to said spray outlet, and second flow path means, fluidically connected to said first flow path means, for conducting said substantially viscous material from said air manifold assembly to said first flow path means; and said air manifold assembly comprising first flow path means fluidically connected to said second flow path means of said material dispensing assembly for conducting a supply of said substantially viscous material from a source of said substantially viscous material, through said air manifold assembly, toward said material dispensing assembly, across said substantially planar interface along which said material dispensing assembly and said air manifold assembly are oppositely disposed, and into said second flow path means of said material dispensing assembly; and second flow path means for conducting a flow of said air in sheet form and along a second direction, within said deposition material die body, which is disposed at a predetermined angle with respect to said first direction of said flow of substantially viscous material so as to contact said substantially viscous material flow with said air flow at said impact position located adjacent to said spray outlet, break up said sheet of substantially viscous material into fine particles, and propel said fine particles of said substantially viscous material, in a direction which is substantially parallel to said second direction of said air flow and along with said air flow, toward and onto said substrate as said deposition material.

12. The applicator head as defined in claim 11, wherein:

said first means of said material dispensing assembly for directing said flow of substantially viscous material is adjustable so as to vary at least one of the amount and pattern of said substantially viscous material conducted toward said impact position.

13. The applicator head as set forth in claim 12, wherein said adjustable means of said material dispensing assembly comprises:

a closure plate secured to said material dispensing assembly and having a material distribution channel defined therein; and a shim interposed between said closure plate and said material dispensing assembly, and having a material flow slot, having a predetermined thickness and material flow control pattern, defined therein, whereby depending upon a particular shim mounted upon said material dispensing assembly, different amounts and flow patterns of said substantially viscous material are able to be discharged toward said spray outlet.

14. The applicator head as set forth in claim 11, further comprising:

means for heating said flow of air to a predetermined temperature prior to said contact of said air flow with said substantially viscous material at said impact position.

15. The applicator head as set forth in claim 14, further comprising:

an air body mounted adjacent to said air manifold assembly and including said means for heating said air flow; and air-controlled valve means fluidically interposed between said air body and said air manifold assembly for controlling the flow of said heated air from said air body to said air manifold assembly.

16. The applicator head as set forth in claim 15, wherein:

said air body is mounted upon a side surface of said air manifold assembly which is opposite said surface of said air manifold assembly which forms said substantially planar interface with said material dispensing assembly.

17. The applicator head as set forth in claim 14, wherein:

said means for heating said flow of air comprises a combination heating coil and baffle structure.

18. The applicator head as set forth in claim 11, wherein:

said spray outlet is located along said interface defined between said material dispensing assembly and said air manifold assembly.

19. The applicator head as set forth in claim 11, wherein:

said spray outlet is disposed substantially perpendicular to said substrate onto which said deposition material is to be deposited.

20. The applicator head as set forth in claim 11, wherein:

said predetermined angle defined between said first and second directions of said material and air flows is within the range of 45°–90°.

* * * * *